Oct. 28, 1930.                H. L. HORN                1,779,971
METHOD OF PREPARING CELLULOSE PULP
Filed Nov. 30, 1929
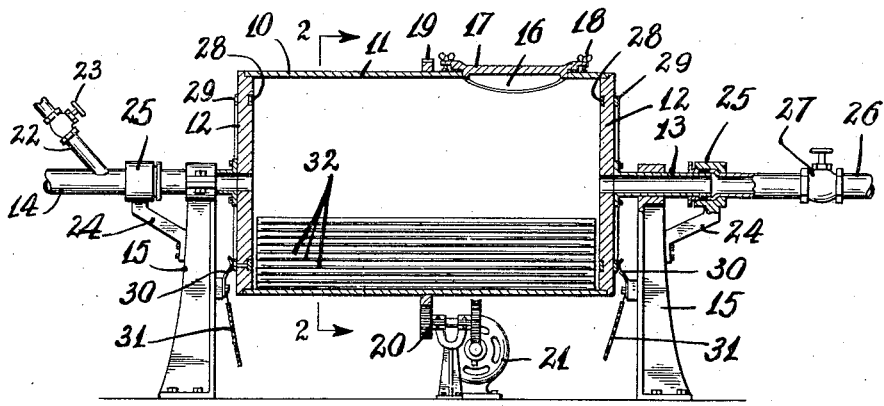
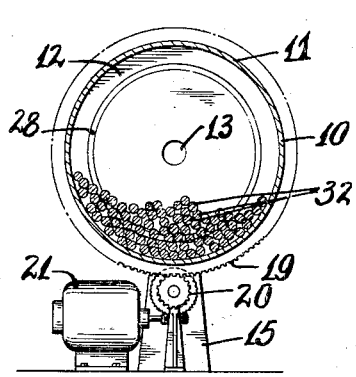
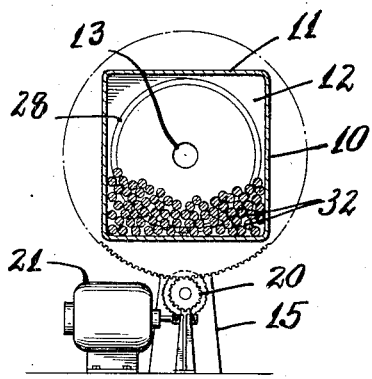
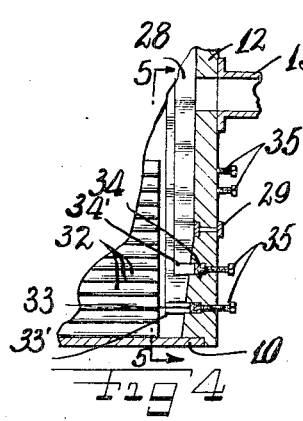
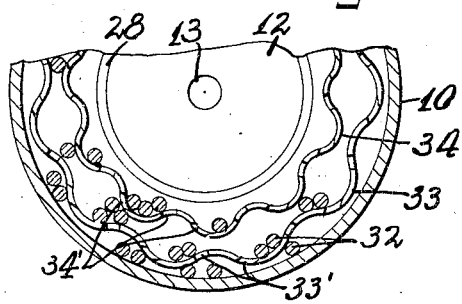
INVENTOR.
Harry L. Horn
BY
ATTORNEY Patented Oct. 28, 1930

1,779,971

UNITED STATES PATENT OFFICE

HARRY L. HORN, OF NEW YORK, N. Y., ASSIGNOR TO BAGASSE DEVELOPMENT INC., A CORPORATION OF NEW YORK

METHOD OF PREPARING CELLULOSE PULP

Application filed November 30, 1929. Serial No. 410,702.

This invention relates to an apparatus for carrying out a method for preparing cellulose pulp from cellulose bearing material such as bagasse, straws, grasses, wood, cornstalk and the like.

The invention relates to similar subject matter as disclosed in my copending application, Serial Number 411,219, filed simultaneously with the present application.

The invention has for an object the provision of a device of the class mentioned which is of simple durable construction, dependable in use and efficient in action, and which can be manufactured and sold at a reasonable cost.

The invention proposes an apparatus adapted to simultaneously cook, beat and electrically and chemically treat bagasse, straws, grasses, wood, cornstalk, and the like for forming a pulp capable of being used in well known manners of manufacturing paper, rayon, etc. and which besides distinguishing in the reduction of the cost of the pulp, differs in the production of a higher grade of pulp.

The apparatus is generally known as a digester and it is proposed to consist of a container movably supported and of electrical resistance material and adapted to hold water and to be steam tight and adapted for receiving shredded bagasse, or the like and water, means for passing steam into said container, means for passing electric current thru said water, and means for beating the shredded bagasse or the like within said container.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a longitudinal vertical sectional view of a digestor constructed according to this invention.

Fig. 2 is a transverse vertical sectional view taken on the line 2—2 of Fig. 1.

Fig. 3 is a view similar to Fig. 2, but of modified form.

Fig. 4 is a fragmentary enlarged detailed view similar to a portion of Fig. 1, but illustrating another embodiment of the invention.

Fig. 5 is a fragmentary vertical sectional view taken on the line 5—5 of Fig. 4.

The digestor consists of a container 10 movably supported and of electrical resistance material and adapted to hold water and to be steam tight and adapted for receiving shredded bagasse or the like and water, means for passing steam into said container, means for passing electrical current thru said water, and means for beating shredded bagasse or the like within said container.

Said container 10 may be of any design, construction or shape. As shown in Fig. 2 it is circular in transverse cross section. In Fig. 3 a modified form has been shown which is square in transverse cross section. In each of these forms the container consists of a horizontal tubular portion 11 and closed vertical ends 12. Pipes 13 and 14 coaxially connect with the closed ends and discharge within the container. Standards 15 rotatively support these pipes and thus rotatively support the container constituting the said movable support. A manhole 16 is formed in one of the sides of the container and is normally covered with a plate 17 held down by latches 18. Peripheral teeth 19 are formed upon the container, only in the species illustrated in Figs. 1 and 2, and mesh with a pinion 20 and connected thru suitable worm and worm wheel to the shaft of an electric motor 21 adapted for rotating the container. Other mechanical means may be provided for rotating the container if of other than circular form.

The pipe 14 may be utilized for discharging shredded bagasse within the container. A water supply pipe 22 connects with the pipe 14 and is provided with a control valve 23. A proper quantity of water may be discharged into the container by manipulation of the valve 23. The pipe 13 may be utilized for the discharge of steam within the container. A bracket 24 is mounted upon the standard 15 and supports a swivel joint 25 arranged for connecting a stationary steam pipe 26 with the pipe 13. A control valve 27 is interposed in the pipe 26.

The said connections for passing an electric current thru the water and into the container consists in circular interior terminals 28 mounted on each of the ends of the container and connected with circular exterior contacts 29 on each of the ends and engaged by contact shoes 30 supported upon the standards 15 and connected with electrical cables 31. A circuit exists from one of the cables 31 to its contact shoe 30, along the circular contact 29 to the circular terminal 28 thru the water to the opposite circular terminal, then to the external circular contact, the contact shoe and the other lead.

The means for beating the shredded bagasse within the container consists of a plurality of rods 32 preferably of non-metallic material and arranged horizontally within the container and substantially the full length thereof. These rods may be round or of any other suitable shape and may be formed with depressions, slots, grooves or the like. Upon rotation of the container, it is calculated that these rods mix with the bagasse and water and constitute the beating action. The water level should be below the pipes 13 and 14.

In Figs. 4 and 5, a modified means has been illustrated for accomplishing the beating of the shredded bagasse. This means consists of adjustable rod guides 33 and 34 mounted on each of the vertical ends of the container and of different shapes for different actions. These rod guides are concentric about the center of each of the vertical ends and are of wavy form. The waves of the different rod guides are of different sizes, and as shown in Fig. 5, the waves of guide 33 are quite large relative to the waves of guide 34.

Each rod guide has a plurality of serrations 33' and 34' to allow bars 32 to fall therethru. This arrangement allows a more rapid action in beating the shredded bagasse.

Normally these guides are housed within grooves in the vertical ends so as to be inoperative. Screws 35 rotatively connect with the rod guides and threadedly pass thru the vertical ends and extend to the outside of the container. Upon turning of the screws, one or the other of the rod guides may be projected into the path of motion of the plurality of rods 32. When so projected, the rod guide separates the rods 32, that is, divides them into independent groups.

The independent rods of each of the groups coact with the other rods of the same group during rotation of the container and accomplish the beating. It has been found that this arrangement permits a better circulation of the cellulose material around the rods. It is intended that first the rod guide with the large waves be projected so that course beating of the pulp is accomplished and towards the end of the beating operation these rod guides be retracted and the other ones projected for finishing the beating operation with finer beatings.

In operation of the apparatus, shredded bagasse may be engaged within the container thru the entrance pipe 14 or thru the manhole 16 as is more convenient. The proper quantity of water may next be let into the container by manipulation of the valve 23. Then sodium chloride is added to the water. Next the container is rotated and the current turned on so that a flow exists thru the water. The sodium chloride is a softening agent and coupled with the electrical action very efficiently softens the shredded bagasse.

After about two hours rotation, lime and soda ash is introduced into the water in the container. Then the rotation is continued and the valve 27 opened for passing a supply of steam at a pressure of from thirty to fifty pounds within the container. This steam cooks the bagasse and together with the chemical action of the lime and soda produces the paper pulp. After about one or two hours of rotation of the container with the steam, the apparatus is shut off and the pulp and water removed. The water or juice may be drained from the cotton-like pulp now obtained.

It is to be understood that lining material of rubber or any other material may be used within the container.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasse or the like and water, means for passing steam into said container, means for passing electric current thru said water, and means for beating the bagasse within the container.

2. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasse or the like and water, means for passing steam into said container, means for passing electric current thru said water, and means for beating the bagasse within the container, said container being of electrical resistance material.

3. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasses or the like and water, means for passing steam into said container, means for passing electric current thru said water, and means for beating the bagasse within the container, said means for passing steam within the container consisting of a steam pipe coaxial with the axis of said container, and the movable support constituting a rotative movement about said axis.

4. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasse or the like and water, means for passing steam into said container, means for passing electric current thru said water, and means for beating the bagasse within the container, said means for passing current thru the water consisting of circular terminals upon the ends of said container and concentric with the axis of motion, circular contacts upon the ends of the container and on the outer sides and connected with said terminals and contact shoes in contact with the said circular contacts and connected with electrical leads.

5. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasse or the like and water, means for passing steam into said container, means for passing electric current through said water, and means for beating the bagasse within the container, comprising rods loosely arranged within said container.

6. An apparatus for preparing cellulose pulp from cellulose bearing material, comprising a container with steam connections, beating means, electrical and chemical treating means, adapted for simultaneously cooking, beating and electrically and chemically treating said cellulose bearing material.

7. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasse or the like and water, means for passing steam into said container, means for passing electric current thru said water, and means for beating the bagasse within the container, said container comprising a horizontal tubular portion and end vertical portions, adjustable rod guides of different shapes and concentrically mounted in grooves in said vertical ends, means for normally projecting said guide rods within said container and a plurality of rods loosely mounted in said container and constituting the means for beating the cellulose bearing material and engageable in groups by said rod guides when the latter elements are in projected condition.

8. A digestor for carrying out a method for preparing cellulose pulp from cellulose bearing material such as bagasse, straws, grasses, wood, cornstalk and the like, comprising a container movably supported and adapted to hold water and to be steam tight and further adapted for receiving shredded bagasse or the like and water, means for passing steam into said container, means for passing electric current thru said water, and means for beating the bagasse within the container, said container comprising a horizontal tubular portion and end vertical portions, adjustable rod guides of different shapes and concentrically mounted in grooves in said vertical ends, means for normally projecting said guide rods within said container and a plurality of rods loosely mounted in said container and constituting the means for beating the cellulose bearing material and engageable in groups by said rod guides when the latter elements are in projected condition, serrations at the end of the said rod guides to interrupt the action of the said rods.

In testimony whereof I have affixed my signature.

HARRY L. HORN.